Nov. 11, 1930. H. C. ELLIOTT 1,781,500
MOTOR VEHICLE
Filed April 29, 1927
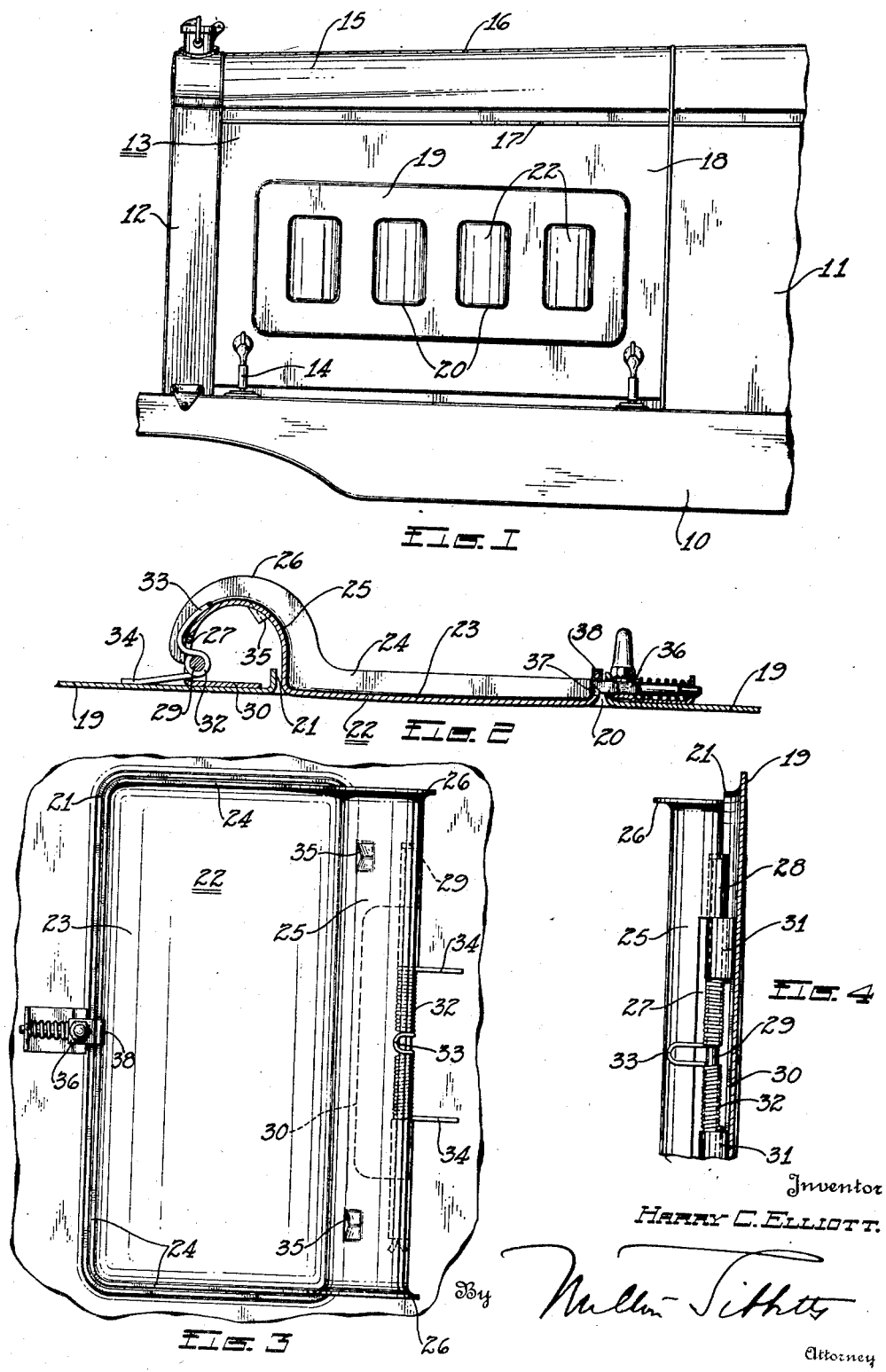

Patented Nov. 11, 1930

1,781,500

UNITED STATES PATENT OFFICE

HARRY C. ELLIOTT, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed April 29, 1927. Serial No. 187,440.

This invention relates to motor vehicles and particularly to ventilators or ventilator mechanism.

An object of the invention is to provide a ventilator having a simple and efficient closing means.

Another object of the invention is to provide a closure or cover for a ventilator, the cover having a hinge member formed integral therewith.

Another object of the invention is to provide a ventilator for a hood or bonnet having a unitary cover and hinge member mounted to efficiently close an opening in the bonnet and so supported in the opening that it will not vibrate and rattle.

Another object of the invention is to provide a unitary door and hinge member so formed that the door and hinge member are rigid, and will when mounted to close an opening swing free and clear of the surrounding wall to avoid defacing the same.

Still another object of the invention is to provide a ventilator for an engine hood or bonnet which is highly efficient in operation and yet of marked simplicity as a whole and in respect to its component parts so that its manufacture is economically facilitated.

Other objects of the invention will appear from the following description taken in connection with the drawings, which form a part of this specification, and in which:

Fig. 1 is a side elevation of a portion of a motor vehicle, illustrating a bonnet equipped with the invention;

Fig. 2 is an enlarged cross-sectional view taken through one of the doors or covers and a portion of the hood;

Fig. 3 is an enlarged rear elevation of one of the doors or covers and a portion of the hood upon which the door is mounted, and Fig. 4 is a fragmentary view taken from the hinged edge of the door.

Referring by numerals to the drawing, 10 represents a side member of a motor vehicle chassis frame, it, of course, being understood that such side members are arranged in pairs connected by cross members and braced together in a manner well known in this art. The side members 10 support a vehicle body, the cowl of which is shown at 11, and positioned on the side members forward of the cowl is a radiator 12 which is suitably spaced from the cowl to provide an adequate engine compartment, not shown. The engine compartment is covered by a hood 13, supported at one end by the cowl and at the other end by the radiator, the hood being secured in position by fastening devices 14 mounted in the side members 10.

The hood 13, illustrated in side elevation in Fig. 1, is formed with right and left top sections 15, hinged together as indicated at 16 and connected to the section 15 by hinges 17 are right and left side sections 18, the structure being such that the bonnet may be easily raised and folded back upon itself to permit access to the engine compartment.

Each side section is provided with a raised panel 19 having stamped therein a plurality of openings 20. As shown, the openings 20 are rectangular in form and are arranged longitudinally in the panel 19 in spaced parallel relation with respect to each other, the metal of the panel around each opening being bent inwardly to form a flange 21.

A door or closure 22 is provided for each opening. As shown, the door comprises a rectangular plate 23 having a peripheral flange 24 which materially stiffens the plate, provides a finished edge and prevents vibration. The flange 24 on one of the side edges of the plate is extended and turned to form an arcuate hinge member 25, the upper and lower ends of which are flanged as indicated at 26, the flanges 26 being integral with the peripheral flange 24. This structure imparts great strength and rigidity to the hinge members and braces the same to the plate or door. The hinge member 25 has an elongated cut-away portion 27, at each end of which is formed a knuckle 28, for the reception of a pintle 29.

Spot-welded or otherwise secured to the back of panel 19 adjacent to the flange 21 is a hinge member 30 having formed thereupon spaced knuckles 31 positioned so as to fit between and registering with the knuckles 28 upon the member 25 for the reception of the pintle 29. Mounted upon the pintle 29 between the knuckles 31 is a sectionalized spring 32 having a connecting loop 33 bearing against the back of the arcuate member 25 and end portions 34 bearing against the back of panel 19. The action of the spring 32 is to move the door outwardly to an open position, the outward movement of the door being limited by stops 35 punched from the back of the member 25 for engagement with the edge of the flange 21, the stops 35 being held in engagement with the flange 21 by the spring 32, the tension which is sufficient to prevent the door from rattling when in an open position. The door is adapted to be held in a closed position by a spring actuated bolt 36, adapted to engage a slot 37 in the flange 24, upon the edge of the door, a sleeve or jacket 38 being clamped upon the flange adjacent to the slot to protect the finish on the edge of the door.

It will be observed that the door is formed integral with an arcuate hinge member which is so pivoted that as the door is moved outwardly by the action of the sectionalized spring, it will swing free and clear of the opening and will not touch the flange surrounding the opening or any portion of the panel, so that all possibility of injury to the finish of the hood by reason of opening and closing the door is avoided. It will also be observed that by providing a unitary door and hinge member a rigid structure is obtained and hence vibration is reduced to a minimum and clicking and rattling of the door in the opening is prevented.

It will be understood that various forms of the invention other than those described above may be used without departing from the spirit or scope of the invention.

Having thus described my invention, what I claim and desire to secure by Lettters Patent is:

1. A closure comprising a plate having a peripheral flange, a hinge member formed by a continuation of the flange on one of the side edges of the plate and flanges on the hinge member integral with the flanges on the top and bottom edges of the plate.

2. A closure comprising a plate having a peripheral flange, a hinge member formed by extending the flange on one of the side edges of the plate, the hinge member having flanges formed integral therewith and in the same plane with the flanges on the top and bottom edges of the plate.

3. A closure comprising a plate having a peripheral flange, a hinge member formed by extending and turning outwardly the flange on one of the side edges of the plate, the hinge member having flanges integral and in the same plane with the flanges on the top and bottom edges of the plate and stops struck from the hinge member.

4. In a ventilator, a panel having an opening therein, a closure for the opening comprising a plate having a peripheral flange, a hinge member integral with the flange on one of the side edges of the plate, a hinge member mounted upon the back of the panel adjacent to the opening, a pintle connecting the hinge members and a sectionalized spring mounted upon the pintle for opening the closure and retaining the closure in open position.

5. A ventilator for the hood of a motor vehicle comprising a panel having an opening therein, a closure for said opening comprising a plate having a peripheral flange, a hinge member formed by extending and turning outwardly the flange upon one of the side edges of the plate, a hinge member on the back of the panel for co-operation with the hinge member on the plate, a spring for moving the closure outwardly and means for retaining the closure in a closed position.

6. A ventilator for the hood of a motor vehicle comprising a panel having an opening therein, a closure for the opening comprising a plate having a peripheral flange, a hinge member for the closure formed by extending and turning outwardly the flange upon one of the side edges of the of the plate, a hinge member upon the back of the panel, a pintle connecting the hinge member, a sectionalized spring upon the pintle adapted to move and retain the closure in an open position and means for securing the closure in a closed position.

7. A ventilator for the hood of a motor vehicle, comprising a panel having an opening therein, the edge of the panel around the opening being bent in to form a flange, a closure for the opening comprising a plate having a peripheral flange, a hinge member formed by extending and turning outwardly the flange on one of the side edges of the plate, a hinge member upon the back of the panel, a pintle for connecting the hinge members, a stop upon the hinge member on the plate adapted to engage the flange upon the panel, a spring for moving and retaining the closure in an open position and means for securing the closure in a closed position.

8. A ventilator for the hood of a motor vehicle comprising a panel having an opening, a portion of the panel around the opening being bent inwardly to form a flange, a closure for the opening comprising a plate having a peripheral flange, a hinge member formed by extending and turning outwardly the flange on one of the side edges of the plate, flanges on the hinge member integral and in the same plane with the flanges on the top and bottom edges of the plate, knuckles on the hinge member, a hinge member on the back of the panel having knuckles fitting between and registering with the knuckles on the hinge integral with the closure, a pintle connecting the knuckles, stops for limiting the movement of the closure, a spring on the pintle to move and retain the closure in an open position and means for securing the closure in a closed position.

9. In a ventilator mechanism for motor vehicles, the combination of a panel having an opening therein and formed with an inturned flange around the opening, a closure for the opening comprising a cover shaped to but slightly smaller than the opening having a continuous inturned flange around its edge, the flange of the cover just clearing the flange of the opening when the cover is in closed position and flush with the opening, an extension on the cover flange at one side thereof, hinge means connecting said extension with the panel, and a device opposite the hinge means for retaining the cover in closed position, said hinge means and said device forming the sole contact means between the closure and the panel.

10. In a ventilator mechanism for motor vehicles, the combination of a panel having an opening therein, a closure for the opening comprising a plate shaped substantially to the opening and arranged to substantially close the opening without touching the edges thereof and leaving a through space between the edges of the panel and closure to prevent collection of dirt, hinge means connecting the closure to the panel so that the plate may swing from closed to open position, and a device opposite the hinge means for retaining the closure in closed position, said hinge means and said device forming the sole contact means between the closure and the panel when the closure is in its closed position.

In testimony whereof I affix my signature.

HARRY C. ELLIOTT.